United States Patent [19]

Sagnes et al.

[11] Patent Number: 5,384,392
[45] Date of Patent: Jan. 24, 1995

[54] PROCESS TO PRODUCE POLYPARAPHENYLENE VINYLENE OR POLYPARATHIENYLENE VINYLENE POLYMERS

[75] Inventors: Olivier Sagnes, Corbreuse; Jean-Claude DuBois, St. Remy Les Chevreuses; Valérie Massardier; Tran van Hoang, both of Villeurbanne; Alain Guyot, Lyon, all of France

[73] Assignee: Thomson-CSF, Puteaux, France

[21] Appl. No.: 899,903

[22] Filed: Jun. 17, 1992

[30] Foreign Application Priority Data

Jun. 18, 1991 [FR] France ................. 91 07421

[51] Int. Cl.$^6$ ................................. C08F 6/00
[52] U.S. Cl. ................................. 528/380
[58] Field of Search ........................ 528/380

[56] References Cited

U.S. PATENT DOCUMENTS

| | | | |
|---|---|---|---|
| 3,532,643 | 10/1970 | Wessling et al. | 528/396 |
| 3,706,677 | 12/1972 | Wessling et al. | 528/373 |
| 4,626,588 | 12/1986 | Murase et al. | 528/391 |
| 4,791,177 | 12/1988 | Murase et al. | 525/328.5 |
| 4,868,284 | 9/1989 | Murase et al. | 528/481 |
| 5,053,166 | 10/1991 | Murase et al. | 252/500 |

FOREIGN PATENT DOCUMENTS

| | | |
|---|---|---|
| 3704411 | 8/1987 | Germany . |
| 2042659 | 2/1990 | Japan . |
| 2215803 | 8/1990 | Japan . |
| 2215804 | 8/1990 | Japan . |

OTHER PUBLICATIONS

Database WPIL, AN-91-211777, Oct. 20, 1989, JP-A-3-134-018, Jun. 7, 1991.

Chemical Abstracts, vol. 112, Abstract No. 217574f, 1990, H. Murata, et al., "Preparation of Poly(2,5-Thienylenevinylene) Films".

Chemical Abstracts, vol. 113, No. 10, Sep. 3, 1990, Columbus, Ohio., US; Abstract No. 79115, H. Murata, et al.: "Preparation of High-Quality Poly(2-5-Thienylenevinylene) Films" p. 10, column 1.

Primary Examiner—Melvyn I. Marquis
Assistant Examiner—Helen F. Lee
Attorney, Agent, or Firm—Oblon, Spivak, McClelland, Maier & Neustadt

[57] ABSTRACT

The invention is a new process to produce polyparaphenylene vinylene or polyparathienylene vinylene polymers using a sulfonium-based polyelectric precursor. This precursor is treated directly with acid to obtain the polymers required. These polymers have high molecular weights and are particularly advantageous in the plastics transformation field.

7 Claims, 5 Drawing Sheets

PROCESS TO PRODUCE POLYPARAPHENYLENE VINYLENE OR POLYPARATHIENYLENE VINYLENE POLYMERS

BACKGROUND OF THE INVENTION

This invention is a new process to produce polyparaphenylene vinylene polymers, whether substituted or not, or polyparathienylene vinylene polymers, whether substituted or not.

These polymers can have very high molecular weights, comparable to those of polyethylenes, which makes them of particular value in the plastic transformation industry, where they can be machined in the form of fibers, films or gels. In addition, they can be doped to obtain sufficiently conductive properties to allow them to be used as anti-static materials capable of dissipating electrical charges.

DESCRIPTION OF THE PRIOR ART

To date, one of the most efficient polyparaphenylene vinylene synthesis processes includes the synthesis of a sulfonium-based polyelectrolyte precursor.

FIG. 1 shows how such a precursor is produced. It illustrates the Wessling method in which a dihalogenated aromatic product is reacted with an aliphatic or cyclic sulfide to produce a monomer containing sulfoniums. This water-soluble monomer is polymerized by cold treatment with soda.

The precursor P1 produced is generally pyrolyzed at high temperature (above 250° C.) under a nitrogen atmosphere to obtain polyparaphenylene vinylene. This technique has the advantage of ensuring almost total elimination of sulfoniums. FIG. 2 illustrates the pyrolysis process. This type of synthesis offers very high yields but the pyrolysis is extremely costly in energy. This is why certain more-recent work has been devoted to other methods of eliminating the sulfoniums. For example, it has been proposed to substitute the sulfonium by an alcoxy group which can be eliminated in an acid medium. Nonetheless, it is still necessary to heat to a temperature of approx 200° C. to eliminate the alcoxy groups and obtain polyparaphenylene vinylene. FIG. 3 gives the reaction diagram for this synthesis method.

The sulfoniums can also be eliminated in a basic medium in the presence of methanol. Slight heating is still necessary but the main disadvantage of this method is that only approx 90% of sulfoniums are converted and this is insufficient (FIG. 4).

SUMMARY OF THE INVENTION

This invention proposes a new method of obtaining class C1 polyparaphenylene vinylene polymers, with a substituted benzene core or not, or class C2 polyparathienylene vinylene polymers, with a substituted thiophene core or not, the process comprising the following steps:

Synthesis of a polyelectrolyte precursor $P_1$ containing the sulfoniums for class C1:

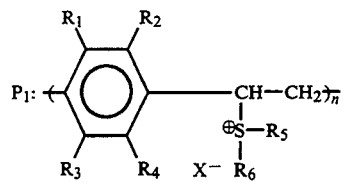

or a polyelectrolyte $P_2$ precursor containing the sulfoniums for class C2:

$P_2$:

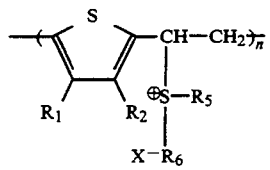

where n = degree of polymerization, $R_1, R_2, R_3$ and $R_4$ may be nothing or may be alkyl, alcoxy, sulfonic or alkylsulfonic substitutes, $R_5, R_6$ are alkyl substitutes, X is a halogen. p Treatment of precursor $P_1$ or precursor $P_2$ with a strong acid.

Preferably, the acid treatment is applied to a film of class C1 polymer or class C2 polymer.

Preferably, the acid treatment is applied at ambient temperature.

The process invented allows high sulfonium conversion rates to be obtained without pyrolysis, which is always expensive in terms of energy consumption.

In addition, the acid treatment makes it possible to produced doped polymers with non-negligible conductivity which offer advantages in, for example, dissipating the charges in electronic components.

BRIEF DESCRIPTION OF THE DRAWINGS

The invention will be better understood and other advantages will become clear upon reading the following description and studying the appended figures of which.

Within the process used to produce class C1 or class C2 polymers, it is also possible, during direct elimination of the sulfoniums in an acid medium, to introduce a doping step to simply produce polymers with advantageous conductive properties. In the invented process, it is preferable for precursor $P_1$ or $P_2$ to be made into a film before applying the acid treatment, to avoid any risk of precipitation of polymer which has already partially reacted.

The film of precursor polyelectrolyte can be produced by vacuum moulding at a temperature which depends on the type of polyelectrolyte. The film produced is then submerged in a concentrated strong acid, for example sulfuric acid, sulfonic methane acid or perchloric acid. The film is left in the acid until no more gas evolves. The contact time depends on the thickness of the film used.

After submersion in the acid medium, the film may be treated with an acetonitrile solution to eliminate excess acid. Finally, the film is dried under a nitrogen stream.

An example of polyparaphenylene vinylene synthesis in the presence of concentrated sulfuric acid (95–97%)

Figure 1:
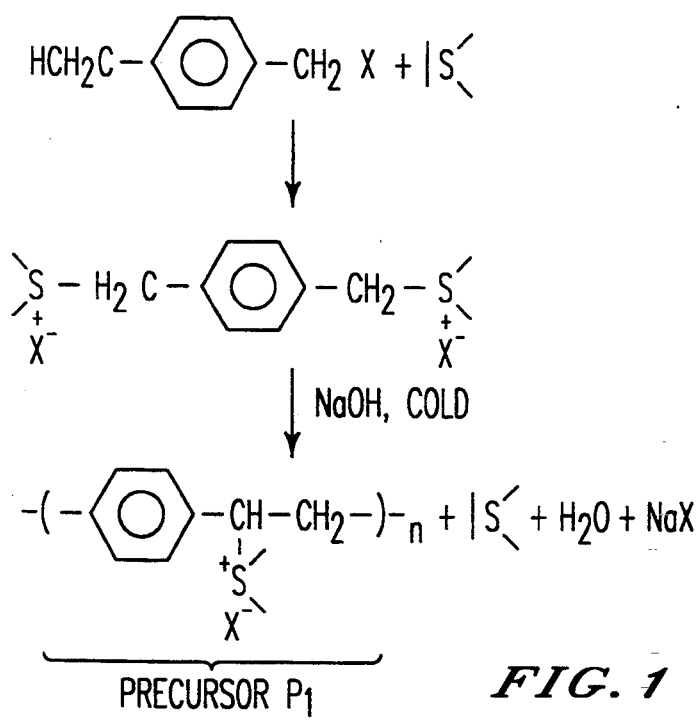
FIG. 1 is the reaction diagram for the synthesis of precursor $P_1$ or $P_2$ complying with the prior art.
Figure 2:
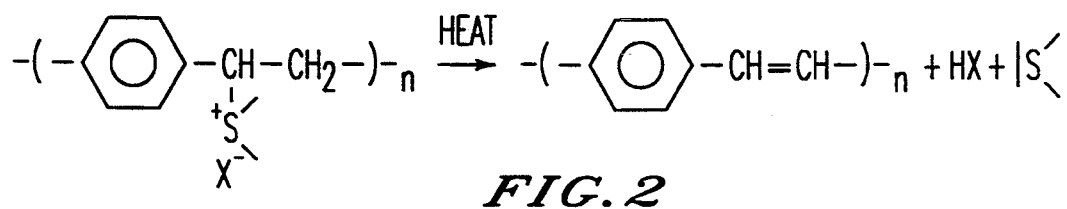
FIG. 2 illustrates how polyparaphenylene vinylene is prepared by pyrolysis of a precursor $P_1$.
Figure 3:
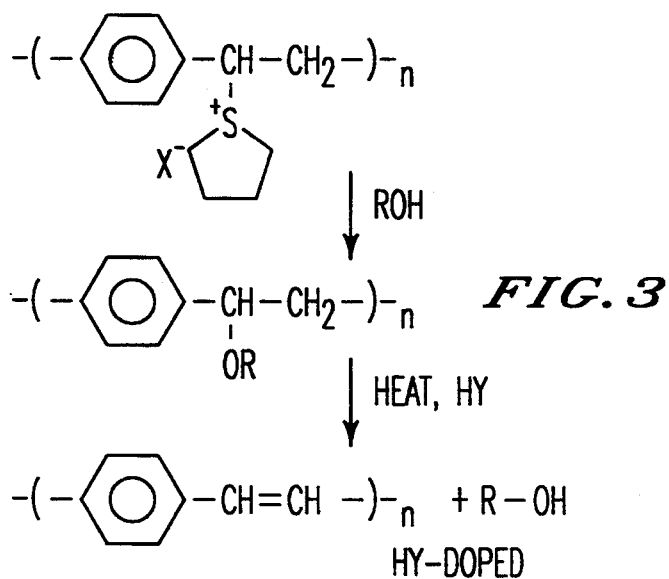
FIG. 3 shows how sulfoniums are eliminated from the precursor $P_1$ in the prior art.
Figure 4:
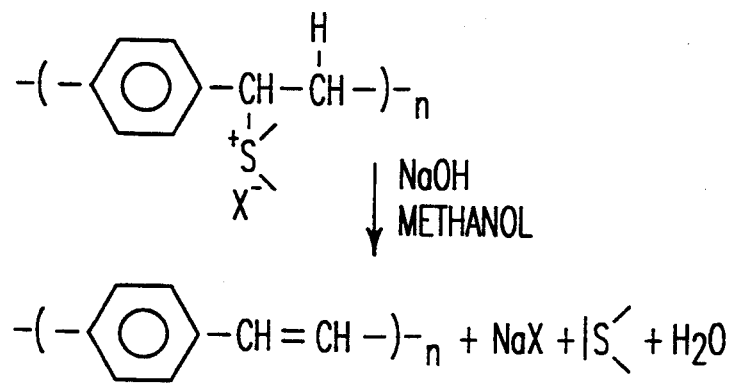
FIG. 4 shows another process used to eliminate sulfoniums from precursor $P_1$ in the prior art.
Figure 5:
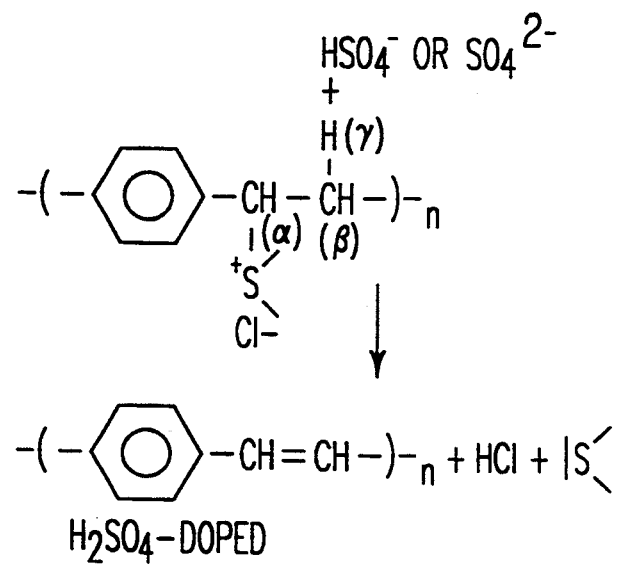
FIG. 5 shows a step in the elimination of sulfoniums from precursor $P_1$ in the presence of sulfuric acid.

FIG. 5 describes the sulfuric acid treatment applied to the precursor to produce polyparaphenylene vinylene.

The precursor counterion used in this example of synthesis is the chloride ion $Cl^-$. The strong release of hydrochloric acid observed during the reaction suggests a mechanism in which the sulfuric acid protons combine with the chloride counterions to form volatile hydrochloric acid. The $SO_4^{2-}$ or $HSO_4^-$ could react with the hydrogen ions in the ($\gamma$) position relative to sulfonium.

The treatment was applied to a 10 mm-thick yellow film of precursor with insulating properties. After submersion for 18 hours in the concentrated sulfuric acid bath, the film was dark brown and had a conductivity of 0.4 S/cm. The product obtained was subjected to infrared analysis. The results of the analysis were compared to infrared analysis of a polyparaphenylene vinylene produced by pyrolysis and an infrared analysis of the precursor.

The dope must first be eliminated from the film produced by submersion in an acid bath to ensure infrared analysis of the polymer only. To this end, it was submersed in running water for more than 45 minutes.

Figure 6:
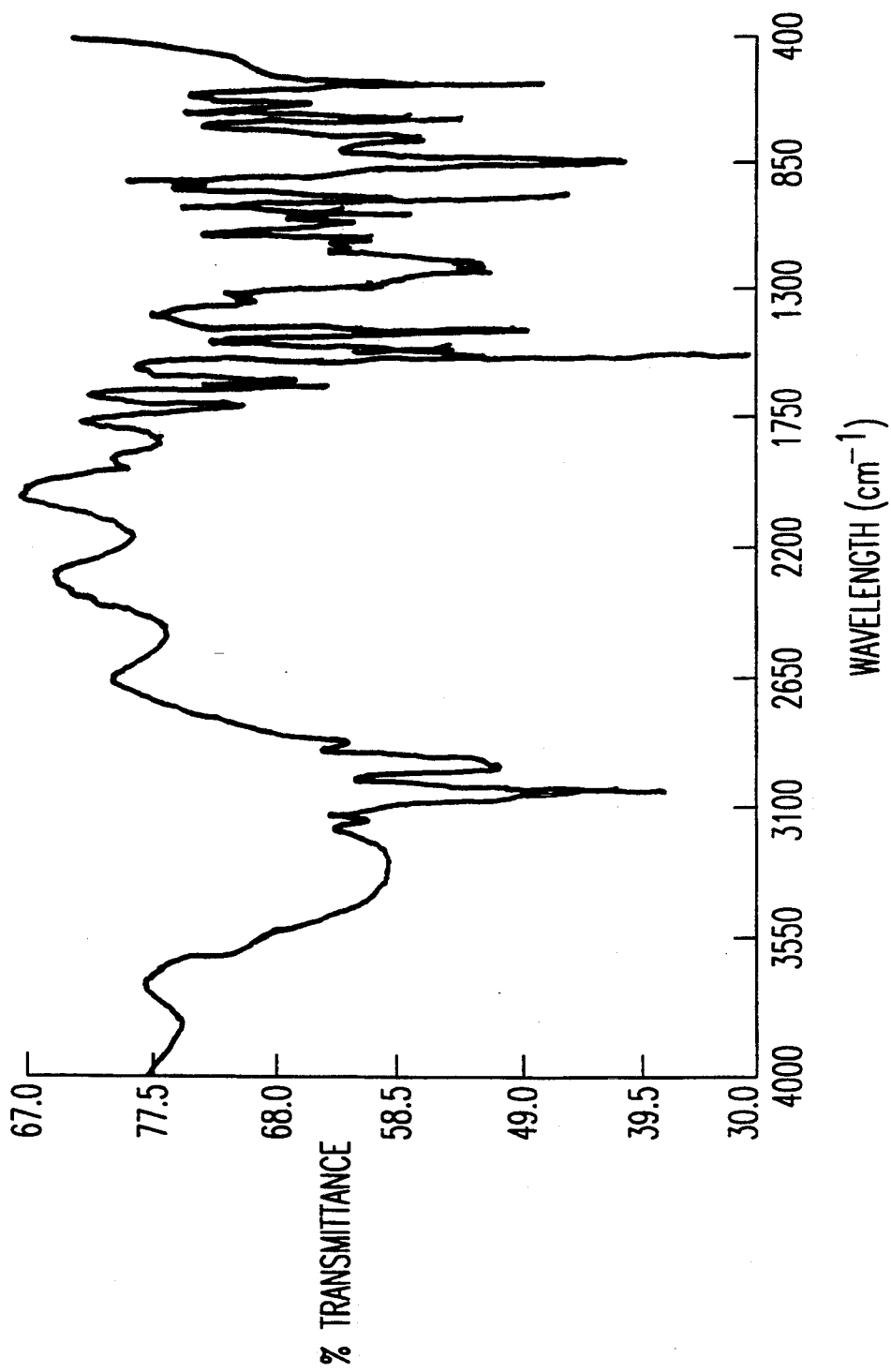
FIG. 6 shows the infrared spectrum obtained from a polyelectrolyte precursor for polyparaphenylene vinylene (PPV)
Figure 7:
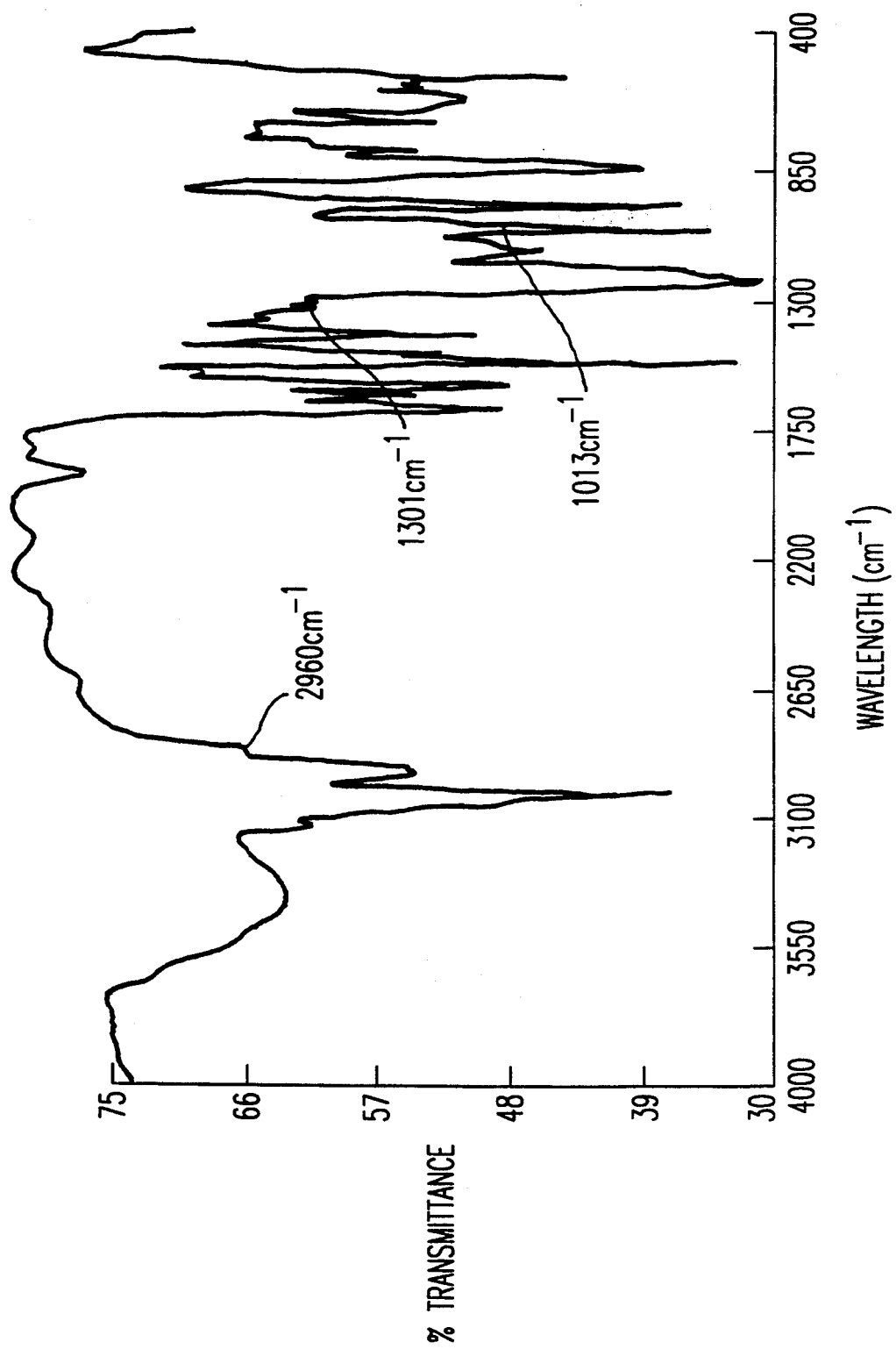
FIG. 7 shows the infrared spectrum obtained from PPV produced by the acid treatment complying with the invention.
Figure 8:
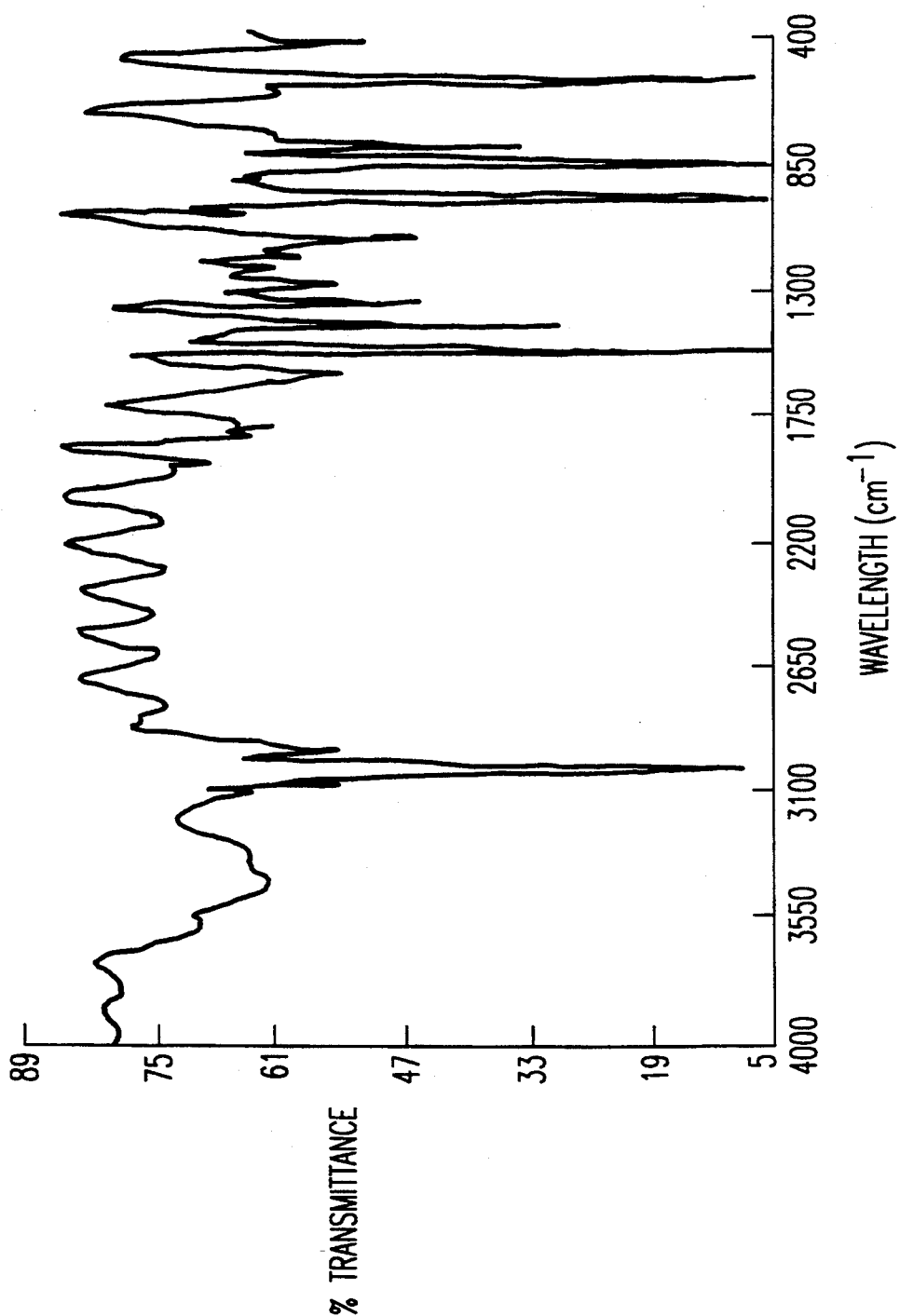
FIG. 8 shows the infrared spectrum obtained from PPV produced by pyrolysis as in the prior art.

The infrared spectra obtained from the polyelectrolyte precursor, the polyparaphenylene vinylene produced in compliance with the invention and a polyparaphenylene vinylene produced by pyrolysis in compliance with the prior art are shown in FIGS. 6, 7 and 8 respectively.

The spectra in FIGS. 6 and 7 differ appreciably at the bands characteristic of tetrahydrothiophene (2960, 1301 and 1012 $cm^{-1}$) relative to the sulfonium. These bands are much less clearly marked in the spectrum in FIG. 7, showing that sulfoniums have been eliminated. The spectra in FIGS. 7 and 8 show that the products obtained are the saint whether produced by acid treatment or pyrolysis.

In parallel, the elementary chlorine analysis of the product produced in compliance with the invention shows that the final product contains 1.54% of chlorine. These chlorine atoms, being the sulfonium counterions, are indicative of the remaining sulfoniums. The conversion rate is therefore 98.46%. This is as high as that obtained with the pyrolyzed precursor in which, after a two-hour treatment at 180° C., the conversion rate was 98.3%.

Comparison of the conductivity of a polymer produced in compliance with the invention and that of a polymer produced by pyrolysis and then doping.

EXPERIMENT A:

A 15 mm-thick precursor film $F_1$ is pyrolyzed for 2 hours at 250° C. to produce a film of polyparaphenylene vinylene. This film $F_1$ is then submerged for 2 hours in a concentrated sulfuric acid solution (95 to 97%).

EXPERIMENT B:

A 15 mm-thick precursor film $F_2$ is directly submerged for 2 hours in a concentrated sulfuric acid solution (95 to 97%).

After treatment in the acid bath, both films are quickly rinsed in permutated water and then dried for some 10 hours under vacuum since the affinity of sulfuric acid for water traps a certain quantity of water in the films.

The conductivity of the two films is then measured and the elimination of dope from films is studied after soaking them in water for a time t and drying them for 1 hour under a vacuum at 40° C.

Table 1 summarizes the conductivities measured, in S/cm, on films $F_1$ and $F_2$ at different values of time t (in seconds):

TABLE I

| conductivity S/cm | t = 0 | t = 15 | t = 23 | t = 38 | t = 43 |
|---|---|---|---|---|---|
| Film $F_1$ | 0.15 | $1.5 \cdot 10^{-7}$ | $1.5 \cdot 10^{-7}$ | $1.5 \cdot 10^{-7}$ | $10^{-7}$ |
| Film $F_2$ | 0.5 | 0.01 | $2.10^{-4}$ | $10^{-5}$ | $10^{-6}$ |

These results show that the conductivity of a polymer produced by treating a precursor with acid is better than that of a polymer produced by pyrolysis followed by doping. In addition, the conductivity of film $F_2$ drops more slowly, seeming to indicate that the sulfuric acid is more intimately bonded to the polymer produced by the chemical method. This phenomenon is doubtless due to the presence of a less dense network which allows foreign agents to penetrate the polymer chains more easily.

This process of producing a polyparaphenylene vinylene or polyparathienylene vinylene polymer by directly chemically treating a polyelectrolyte precursor is therefore particularly advantageous in producing conductive polymers.

What is claimed is:

1. A process to produce polyparaphenylene vinylene polymers, which comprises:

contacting a polyelectrolyte precursor $P_1$ containing sulfonium groups, where $P_1$ is

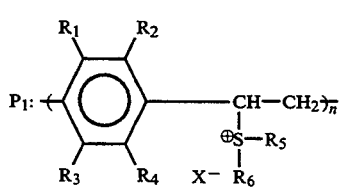

and where n is the degree of polymerization,
$R_1$, $R_2$, $R_3$ and $R_4$ are hydrogen, alkyl, alkoxy, sulfonic or alkylsulfonic groups,
$R_5$ and $R_6$ are alkyl groups, and
X is a halogen ion, with a sufficient amount of a concentrated strong acid to remove the sulfonium groups, said process being carried out without a pyrolysis step.

2. The process of claim 1, in which the precursor $P_1$ is formed into a film and said film is then submerged in a bath of said concentrated strong acid.

3. The process of claim 1, wherein said contacting step is carried out at ambient temperature.

4. The process of claim 1, wherein the concentrated strong acid is selected from the group consisting of sulfuric acid, methanesulphonic acid and perchloric acid.

5. The process of claim 1 wherein X is chloride ion.

6. The process of claim 2, wherein gas evolves from said film upon submersion in said concentrated strong acid, and said film is submerged in said concentrated strong acid until the evolution of gas ceases.

7. The process of claim 2, wherein said film is contacted with acetonitrile after submersion in said concentrated strong acid.

* * * * *